March 31, 1964 TATSUO KOBAYASHI 3,126,801
AUTOMATIC SHUTTER MECHANISM
Filed Oct. 17, 1962

INVENTOR.
TATSUO KOBAYASHI
BY Stanley Wolder
ATTORNEY

3,126,801
AUTOMATIC SHUTTER MECHANISM
Tatsuo Kobayashi, Osaka, Japan, assignor to Minolta Camera Co. Ltd., Osaka, Japan, a corporation of Japan
Filed Oct. 17, 1962, Ser. No. 231,119
6 Claims. (Cl. 95—10)

The present invention relates generally to improvements in cameras and it relates particularly to an improved light controlled automatic shutter mechanism.

The conventional camera in which the exposure is automatically controlled in response to the incident light generally operates by automatically regulating the diaphragm aperture in response to the incident light. This type of control, by reason of the fixed shutter speed during the automatic exposure is limited to a relatively narrow range. In U.S. Patent No. 3,051,065 granted August 28, 1962, to Tatsuo Kobayashi there is described in detail a unique camera lens shutter in which a diaphragm type shutter is controlled by a single element whereby the opening aperture and exposure time are concurrently adjusted so that an increase in the shutter diaphragm opening is accompanied by an increase in the exposure time. The opening and closing cycle of the shutter is substantially constant and the exposure control is effected by adjusting the overlap position of the diaphragm blades at the initiation of the exposure cycle. The control member is associated with a photoelectric exposure meter to facilitate the proper adjustment of the exposure control.

It is a principal object of the present invention to provide an improved camera shutter mechanism.

Another object of the present invention is to provide an improved automatic light controlled camera shutter mechanism.

Still another object of the present invention is to provide an automatic light controlled shutter mechanism in which a wide range of exposures is available.

A further object of the present invention is to provide an improved automatic light controlled shutter mechanism wherein regulation is effected by automatic adjustment of the overlap of the shutter diaphragm blades in response to the incident light upon initiation of the exposure cycle.

The above and other objects of the present invention will become apparent from a reading of the following description taken in conjunction with the accompanying drawings, wherein.

Figure 1:
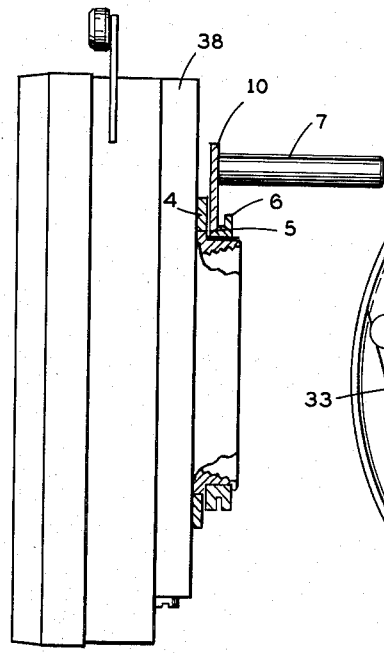
FIGURE 1 is a fragmentary side elevational view of a shutter mechanism embodying the present invention.
Figure 2:
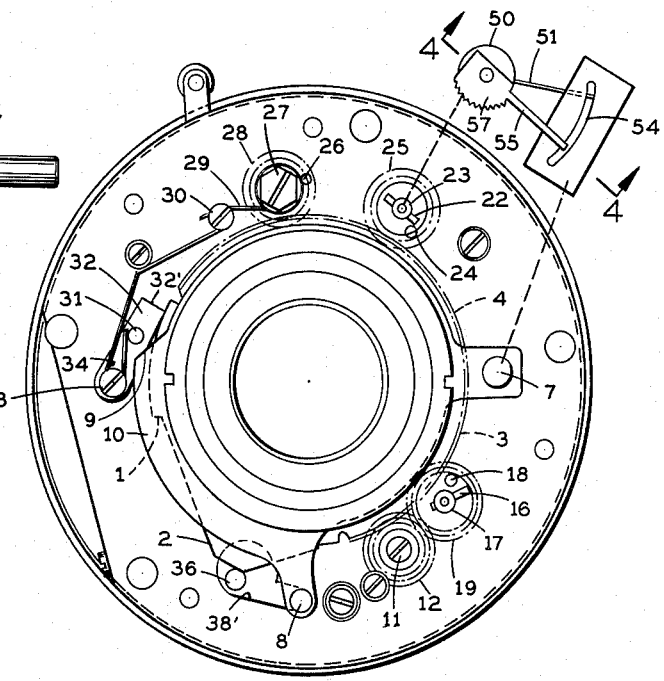
FIGURE 2 is a rear elevational view thereof shown associated with a photoelectric control device.

In a sense the present invention contemplates the provision of the combination comprising a camera shutter mechanism including shutter blades movable upon release from a cocked position, means for adjusting the closed overlap position of said blades whereby to vary the degree and time of opening thereof, and light responsive means automatically regulating said overlap adjusting means in accordance with the light incident thereon.

Referring now to the drawings which illustrate a preferred embodiment of the present invention, the reference numeral 4 generally designates a set ring having an outer step portion 1 trailed successively by an inclined shoulder 2 and peripheral gear defining teeth 3 and rotatably located within a shutter casing 38. A nut 6 having a step portion 5 is screwed to the casing 38 to retain the set ring 4 through an intermediate seat and rotatably supports a release ring 10 formed with a peripheral inclined edge 9 and provided with a rearwardly directed release pin 7 and a bulb operating forwardly directed pin 8.

A set gear 12 is rotatably supported by a shaft 11 and engages the set or shutter cocking ring gear 3. A set lever 15, which engages a short arm 14' of an L-shaped second lock and release lever 14 pivoted on a shaft 13, is located inside the shutter case and protrudes to the rear and rotatably engages a charge shaft 17 provided with a radial operating pin 16. A charge gear 19, having a pin 18 corresponding to the actuating pin 16 also engages the gear 12. In a similar manner, a cam 21 is rockably supported in the casing 33 and is resiliently engaged by a follower pin 20 mounted on the operating or shutter blade revolving ring (not shown) which is located inside of the shutter case, the function of said operating ring being to change the degree of overlapping of shutter blades as described in detail in the aforesaid Kobayashi patent, the pin 20 projecting to the rear side. A meter controlled connecting shaft 23 having a radial operating pin 22 rotatably supports a wind-up gear 25 having an eccentric pin 24 and engaging the set ring gear 3. A return gear 28 having a spring stopper pin 26 is pivoted to the shaft 27 and engages set ring gear 3, one end of a spring 29 wound around the shaft 27 being anchored to the pin 26 on the return gear 28, the other end being hooked on the fixed pin 30. A lock lever 32 having a pin 31 registering with the slope 9 of the release ring 10 is pivoted on a shaft 33, and a spring 34 urges it clockwise to resiliently contact the periphery of the set ring 4. Inside the shutter case is pivoted a second release lever 37, having an eccentric pin 35 registering with the long arm of said second lock lever 14 and a pin 36 registering with the shoulder portion 2 of the set ring 4. When the set gear 12 is rotated counter clockwise, the meshing charge gear 19 is rotated clockwise and the pin 18 engages the operating pin 16 to rotate the charge shaft 17 and the set or shutter cocking lever 15 and simultaneously the shutter is cocked in the manner described in the aforesaid Kobayashi patent. The stepped portion 15' on the cocking lever 15 is engaged by the short arm 14' of the lock and release lever 14 and its return is releasably prevented.

The gear 25 coupled with the light controlled shaft is rotated counter-clockwise by the set ring gear 3 engaged with set gear 12 and rotated clockwise, and the connecting shaft 23 is rotated counter clockwise by the actuating pin 22 urged by pin 24, thus the spring (not shown) is wound up and charged, and in turn the cam 21 in the shutter case secured on said shaft is also rotated and the pin 20 engaging cam 21 is moved thereby. The operating ring is also rotated, and the preparation for exposure is thus completed, and the returning gear 28 is also rotated counter clockwise by the set ring gear 3 and loading the spring 29 wound around its shaft 27, and the lock lever 32 resiliently engaging the periphery of set ring 4 falls into the stepped portion 11 and is engaged therewith by the clockwise rotation of said ring, thus preventing its restoration.

The light responsive control device includes a meter 50 connected in the usual manner to a photoelectric cell and provided with a swinging needle 51. The free section of the needle 51 is movable between a pair of clamp plates 52 and 53 which are movable toward and away from each other to alternatively lock and release the needle 51. A pair of registering arcuate slots 54 are formed in the plates 52 and 53. Pivotly supported concentric with the needle 52 is a follower arm 55 terminating in a depending leg 56 registering with the slots 54, the opposite end of the arm 55 being provided with a quadrant gear 37. The gear 57 is connected by a gear train to the shaft 23 and one of the clamp plates 52 is suitably coupled to the shutter release and is actuated prior to the release pin 7. As the shutter is cocked the clamp plates 52 and 53 are first urged to their needle clamp position and the shutter then released.

Figure 3:
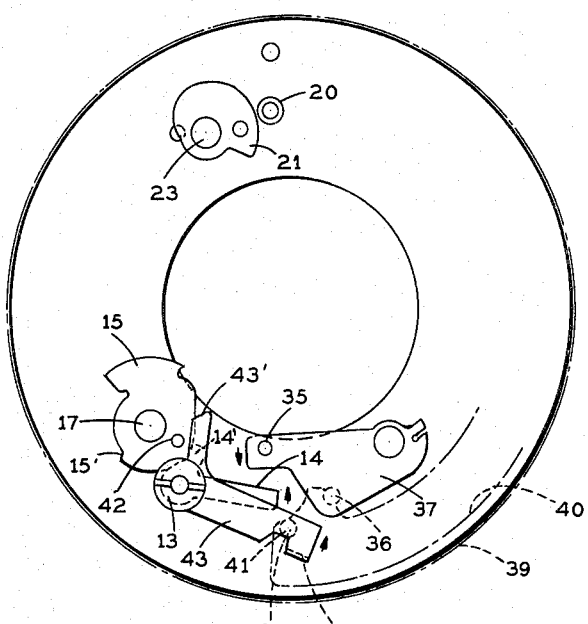
FIGURE 3 is a front fragmentary elevational view.
Figure 4:
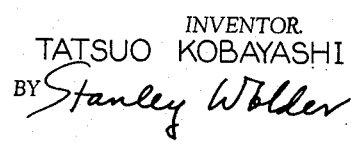
FIGURE 4 is a sectional view taken along line 4—4 in FIGURE 2.

Thus the cocking being completed, when the release ring 10 is rotated clockwise by the pin 7, the slope 9 swings the pin 31 outwardly and the lock lever 32 rotates counter clockwise against the spring 34, the end portion 32' is released from the stepped portion 1 and set ring 4 begins to rotate counter clockwise through the return gear rotated clockwise by the previously loaded spring 29. The winding gear 25 rotated clockwise by the gear 3 to its initial position and the connecting shaft 23 is thereby released and spring urged clockwise toward its return position. During the above rotation of the shaft 23, the arm 55 moves correspondingly clockwise until it is engaged by the pointer 51 of the electric exposure meter 50, which has been deflected to a position corresponding to the intensity of illumination of the object to be photographed to thereby prevent the further rotation of the arm 55 and shaft 23. Accordingly the cam 21, which is fixed on shaft 23 is also stopped, thereby positioning the pin 20 and thus controlling the degree of overlapping of the shutter blades so that the shutter blade operating ring is set at an appropriate exposure speed. The camera is now ready for the next exposure cycle of operation. On the other hand, as the shoulder 2 of the set ring 4 which rotates counter clockwise kicks out the pin 36 of the second release lever 37 protruding from the case hole 38' at the last rotating position, said lever 37 rotates counter clockwise in FIG. 3, the other pin 35 on said lever 37, therefore, pushes the long arm of the release lever 14 facing said pin 35, the release lever 14 rotates clockwise, the short arm 14' of the release lever 14 is disengaged from the set lever 15 thus releasing the lever 15 and effecting the operation of the shutter blades, i.e. the operation of exposure is carried out as it is known heretofore.

L-shaped bulb lever 43 includes a long arm provided with a pin 41 engaging a cam 40 of a regulating ring 39 rotatably fitted around the periphery of shutter case, and a bend 44 registering with the bulb operating pin 8, and a short arm confronting the projection 42 of the set lever 15. The lever 43 is resiliently supported on the common shaft with the second lock lever 14. For effecting a bulb-exposure, the shutter is set as usual, the governor ring 39 is rotated to the bulb mark, the pin 41 bears against the cam 40 and the bulb lever 43 assumes a counter clockwise position (FIG. 3), the end 43' of the short arm being carried into the path of the projection 42. Upon depression of the shutter button and rotation of the release ring 10, the set ring 4, the second release lever 37, and the second lock lever 14 are actuated, and the engagement of the set lever 15 is released thus opening the shutter blades, and at the same time the projection 42 is engaged by the end 43' of the short arm and the bulb operating pin 8 of the release ring 10 abuts the bend 44 of the bulb lever 43 thus preventing the clockwise rotation of the bulb lever by the energy of set lever and the shutter is kept opened. On releasing the hand, the release ring 10 is spring rotated to the original position, and as the bulb operating pin 8 is retracted from the bend portion 44, the projection 42 rotates re- jecting the bulb lever, thus the shutter blades are closed and the bulb exposure is completed.

The lens shutter mechanism according to the above described embodiment comprises a gear 3 at the periphery of set ring 4, said gear 3 engaging a set gear 12 disposed at the outer part thereof and a winding gear 25 and return gear 23 respectively for control by a light responsive device so that there is freedom in selecting the position of the respective gear shafts, especially as the charge gear 19 is in engagement with set gear 12, the position of the shaft can be selected independent of the diameter of set ring. Thus the lens shutter according to the present invention has a high versatility in both arrangement and design of various coupling parts with respect to the body, and the space therefor is highly compact.

While there has been described and illustrated a preferred embodiment of the present invention, it is apparent that numerous alterations, omissions and additions may be made without departing from the spirit thereof.

What is claimed is:

1. The combination comprising a camera shutter mechanism including shutter blades movable upon release from a cocked position sequentially to successively relatively open and closed position, means for adjusting the closed overlap position of said blades whereby to vary the degree and time of opening thereof, means including a cam rockable between an advanced and a retracted position and urged to a retracted position upon cocking of said shutter and spring urged to an advanced position upon release of said shutter, light responsive means for limiting the advance movement of said cam in accordance with the light incident on said light responsive means, said overlap adjusting means including a follower engaging said cam.

2. The combination of claim 1 wherein said cam advance limiting means includes a meter having a needle swingable in accordance with said incident light and an arm swingable with said cam and along the path of said needle.

3. The combination of claim 1 wherein said cam advance limiting means includes a meter having a needle swingable in accordance with said incident light, means for clamping said needle upon the release of said shutter mechanism, and an arm swingable with said cam along the path of said needle.

4. The combination of claim 1 including a rockable peripherally toothed first gear set ring, a second gear engaging said first gear, an axial shaft connected to said cam, and a coupling connecting said gear and said shaft for alternatively advancing and releasing said shaft.

5. The combination of claim 1 including means for releasably locking said shutter blades in their open position.

6. The combination of claim 1 wherein said regulating means includes a control member movable between a retracted and advanced position in accordance with the degree of overlap of the shutter blades and urged to a retracted position with the cocking of said shutter mechanism, means advancing said control member with the release of said shutter mechanism and means responsive to the incident light for limiting the position of advance of said control member.

References Cited in the file of this patent
UNITED STATES PATENTS
3,051,065 Kobayashi _____ Aug. 28, 1962